US012649440B2

(12) United States Patent
Lee et al.

(10) Patent No.: US 12,649,440 B2
(45) Date of Patent: Jun. 9, 2026

(54) VEHICLE AND METHOD OF CONTROLLING THE SAME

(71) Applicants: Hyundai Motor Company, Seoul (KR); Kia Corporation, Seoul (KR)

(72) Inventors: Jihye Lee, Hwaseong-si (KR); Dong June Song, Anyang-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 120 days.

(21) Appl. No.: 18/164,411

(22) Filed: Feb. 3, 2023

(65) Prior Publication Data

US 2023/0303034 A1 Sep. 28, 2023

(30) Foreign Application Priority Data

Mar. 28, 2022 (KR) .......................... 1020220037857

(51) Int. Cl.
B60R 25/30 (2013.01)
B60R 25/10 (2013.01)
(Continued)

(52) U.S. Cl.
CPC .............. B60R 25/31 (2013.01); B60R 25/10 (2013.01); B60R 25/102 (2013.01); B60R 25/104 (2013.01); B60R 25/24 (2013.01); B60R 25/25 (2013.01); B60R 25/305 (2013.01); B60R 25/34 (2013.01); B60R 22/48 (2013.01);
(Continued)

(58) Field of Classification Search
CPC ..... B60R 25/10; B60R 25/102; B60R 25/104; B60R 25/24; B60R 25/25; B60R 25/31; B60R 25/34; B60R 25/305; B60R 22/48
See application file for complete search history.

(56) References Cited

U.S. PATENT DOCUMENTS 10,913,425 B1 2/2021 Moeller et al.
2010/0231369 A1* 9/2010 Oya ........................ B60R 25/00
340/426.26
(Continued)

FOREIGN PATENT DOCUMENTS

JP 2005232989 A 9/2005
JP 2019051803 A 4/2019
(Continued)

*Primary Examiner* — Benyam Haile
(74) *Attorney, Agent, or Firm* — Fish & Richardson P.C.

(57) ABSTRACT

A vehicle includes an authentication key system for identifying an authentication key, an occupant sensor for detecting an occupant and generating occupant information, a display to display information regarding vehicle operation, and a controller to control the authentication key system, the occupant sensor, and the display, wherein the controller is further configured to identify a starting authentication key used to turn on the vehicle, identify a driver's getting off in a state in which the vehicle is turned on, identify whether an assistant driver is present inside the vehicle based on the occupant information, and control the display to provide a notification that the starting authentication key has been removed from the vehicle or a notification of vehicle theft warning based on whether the starting authentication key or another authentication key is present and whether the assistant driver is present in the vehicle, after the driver gets off the vehicle.

16 Claims, 6 Drawing Sheets

220

(51) Int. Cl.

| | |
|---|---|
| *B60R 25/102* | (2013.01) |
| *B60R 25/104* | (2013.01) |
| *B60R 25/24* | (2013.01) |
| *B60R 25/25* | (2013.01) |
| *B60R 25/31* | (2013.01) |
| *B60R 25/34* | (2013.01) |
| B60R 22/48 | (2006.01) |

(52) U.S. Cl.

CPC ................ *B60R 2022/4816* (2013.01); *B60R 2025/1013* (2013.01)

(56) References Cited

U.S. PATENT DOCUMENTS

| | | | |
|---|---|---|---|
| 2018/0361991 A1* | 12/2018 | Mitsubayashi | ....... B60R 25/245 |
| 2019/0039546 A1* | 2/2019 | Elangovan | ............. G08B 21/24 |
| 2019/0232917 A1* | 8/2019 | Meng | ..................... B60R 25/33 |

FOREIGN PATENT DOCUMENTS

| | | | |
|---|---|---|---|
| JP | 6564280 | B2 | 8/2019 |
| JP | 2020149485 | A | 9/2020 |
| KR | 20210008635 | A | 1/2021 |
| KR | 20210108157 | A | 9/2021 |

* cited by examiner

THE DOORS ARE LOCKED DUE
TO SMART KEY OR DIGITAL KEY
BREAKAWAY FROM AROUND THE VEHICLE.

D -27℃                                          1324025km

VEHICLE AND METHOD OF CONTROLLING THE SAME

CROSS-REFERENCE TO RELATED APPLICATION(S)

This application claims the benefit of Korean Patent Application No. 10-2022-0037857, filed on Mar. 28, 2022, which application is hereby incorporated by reference in its entirety.

TECHNICAL FIELD

The present disclosure relates to a vehicle capable of enhancing vehicle security and a method of controlling the same.

BACKGROUND

A vehicle can be provided with a smart key as an authentication means for use. Generally, if a driver leaves a vehicle with a smart key while the vehicle is started, a warning sound and a message notifying that the smart key has left the vehicle are provided. Recently, in addition to a smart key, a digital key stored in a mobile device is provided as a vehicle authentication means. Furthermore, biometric information of a driver, such as a fingerprint, can also be used as an authentication means.

However, when the digital key or biometric information leaves a vehicle while the vehicle is started, no warning or notification may be provided. In addition, when a driver gets off a vehicle while leaving a smart key in the vehicle, no warning or notification may be provided. In this case, a problem related to vehicle security may occur.

SUMMARY

An implementation of the present disclosure provides a vehicle configured for identifying various authentication keys for use of the vehicle, and when a driver leaves the vehicle while the vehicle is started on, providing appropriate notifications related to vehicle security in consideration of both a location of the authentication keys and a presence of an assistant driver in the vehicle, and a method for controlling the same.

Additional implementations of the disclosure will be set forth in part in the description which follows and, in part, will be obvious from the description, or may be learned by practice of the disclosure.

In accordance with an implementation of the disclosure, a vehicle includes an authentication key system configured to identify an authentication key for use of the vehicle, an occupant sensor configured to detect an occupant inside the vehicle and generate occupant information, a display configured to display information regarding an operation of the vehicle, and a controller electrically connected to the authentication key system, the occupant sensor, and the display, wherein the controller is configured to identify a starting authentication key used to turn on the vehicle, identify a driver's getting off in a state on which the vehicle is turned on, identify whether an assistant driver is present inside the vehicle based on the occupant information, and control the display to provide a notification that the starting authentication key has been removed from the vehicle or a notification of vehicle theft warning based on whether the starting authentication key or another authentication key is present in the vehicle and whether the assistant driver is present in the vehicle, after the driver getting off the vehicle.

The controller may control the display to provide starting authentication key information and the notification that the starting authentication key has been removed from the vehicle based on an absence of all of the assistant driver, the starting authentication key, and another authentication key in the vehicle, after the driver getting off the vehicle.

The controller may control the display to provide starting authentication key information and the notification of vehicle theft warning based on an absence of the assistant driver and the presence of the starting authentication key or another authentication key in the vehicle, after the driver getting off the vehicle.

The occupant sensor may include at least one of an image sensor provided inside the vehicle, a radar sensor provided inside the vehicle, or a weight sensor provided on a seat of the vehicle, and the occupant information may include at least one of image data obtained by the image sensor, radar data obtained by the radar sensor, or weight data obtained by the weight sensor.

The vehicle may further include a communicator configured to communicate with a mobile device carried by the driver, the controller may control the communicator to transmit the notification that the starting authentication key has been removed from the vehicle or the notification of a vehicle theft warning to the mobile device.

The controller may lock doors of the vehicle based on the starting authentication key and another authentication key being not detected within a predetermined range around the vehicle, after the notification that the starting authentication key has been removed from the vehicle or the notification of vehicle theft warning is provided through the display.

The controller may unlock the doors based on the starting authentication key or another authentication key being detected within the predetermined range around the vehicle, after locking the door.

The vehicle may further include a communicator configured to communicate with a mobile device carried by the driver, the controller is further configured to control the communicator to transmit door lock information to the mobile device.

The starting authentication key and another authentication key may be one of a smart key, a digital key, or biometric information of the driver.

The vehicle may further include a seat belt sensor configured to detect a locking state of a seat belt and a door sensor configured to detect opening and closing of a door of the vehicle, the controller may identify the driver's getting off based on unlocking of the seat belt and opening of the door.

In accordance with an implementation of the disclosure, a method of controlling a vehicle is provided. The method comprises identifying, by a controller, a starting authentication key used to turn on the vehicle, identifying, by the controller, a driver's getting off in a state in which the vehicle is turned on, identifying, by the controller, whether an assistant driver is present inside the vehicle, controlling, by the controller, a display to provide a notification that the starting authentication key has been removed from the vehicle or a notification of vehicle theft warning, based on whether the starting authentication key or another authentication key is present in the vehicle and whether the assistant driver is present in the vehicle, after the driver getting off the vehicle.

The controlling of the display may further include providing, by the controller, starting authentication key information and the notification that the starting authentication key has been removed from the vehicle, based on an absence of all of the assistant driver, the starting authentication key, and another authentication key in the vehicle, after the driver getting off the vehicle.

The controlling of the display may further include providing, by the controller, starting authentication key information and the notification of vehicle theft warning, based on an absence of the assistant driver and the presence of the starting authentication key or another authentication key in the vehicle, after the driver getting off the vehicle.

The identifying of the presence of the assistant driver may be based on at least one of image data obtained by an image sensor provided inside the vehicle, radar data obtained by a radar sensor provided inside the vehicle, or weight data obtained by a weight sensor provided in a seat of the vehicle.

The method may further include transmitting, by the controller, the notification that the starting authentication key has been removed from the vehicle or the notification of vehicle theft warning to a mobile device carried by the driver;

The method may further include locking, by the controller, doors of the vehicle based on the starting authentication key and another authentication key being not detected within a predetermined range around the vehicle, after the notification that the starting authentication key has been removed from the vehicle or the notification of vehicle theft warning is provided through the display.

The method may further include unlocking, by the controller, the doors based on the starting authentication key or another authentication key being detected within the predetermined range around the vehicle, after locking the door.

The method may further include transmitting, by the controller, door lock information to a mobile device carried by the driver.

The starting authentication key and another authentication key may be one of a smart key, a digital key, or biometric information of the driver.

The identifying the driver's getting off may be based on unlocking a seat belt and opening a door of the vehicle.

BRIEF DESCRIPTION OF THE DRAWINGS

These and/or other aspects of implementations of the disclosure will become apparent and more readily appreciated from the following description of the implementations, taken in conjunction with the accompanying drawings, in which:

FIG. 6 is an example view illustrating a notification of door locking provided through the display.

DETAILED DESCRIPTION

Figure 1:
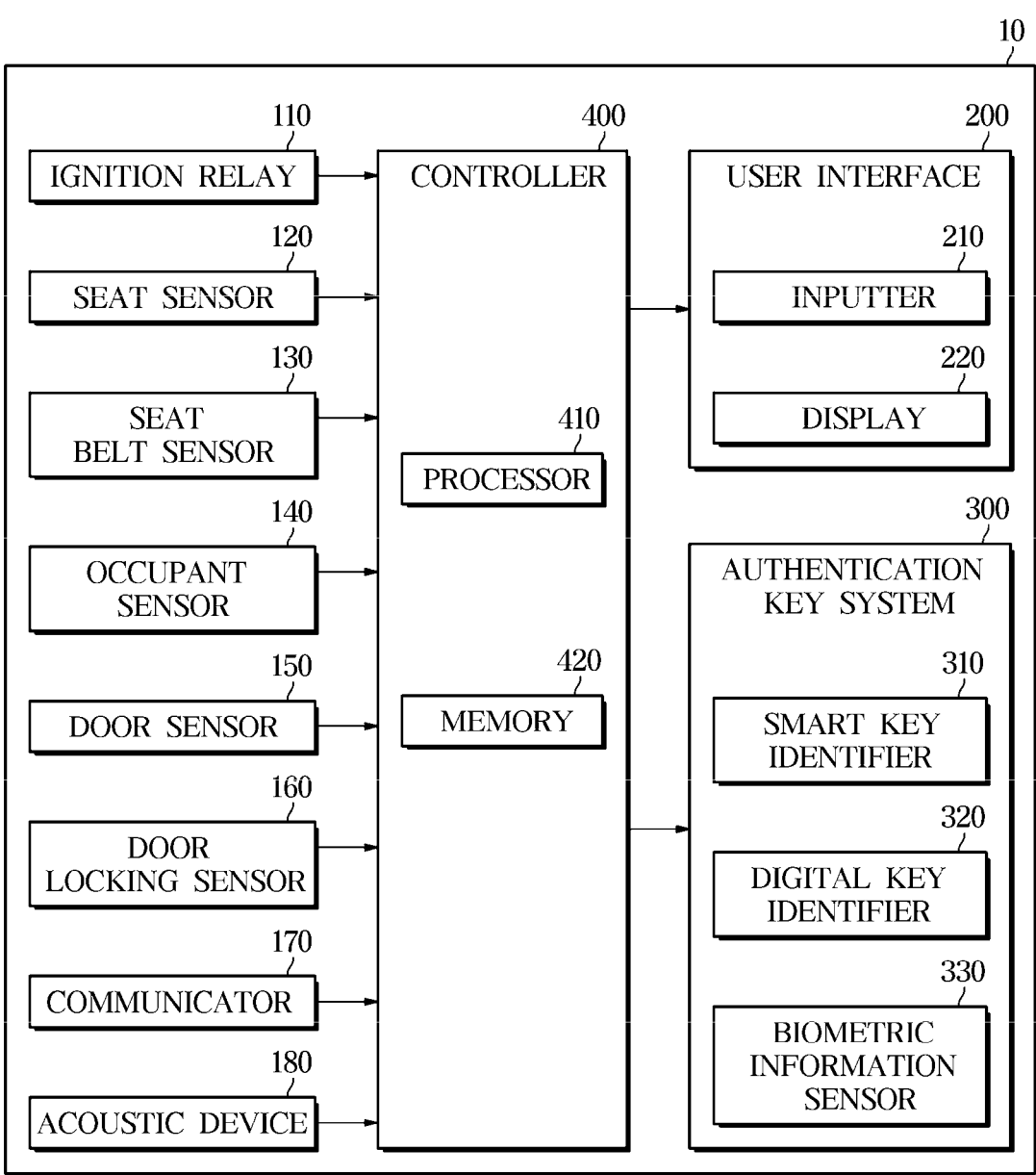
FIG. 1 is a control block diagram illustrating a vehicle according to an exemplary implementation of the present disclosure.

Reference will now be made in detail to the implementations of the disclosure, examples of which are illustrated in the accompanying drawings, wherein like reference numerals refer to like elements throughout. This specification does not describe all elements of the disclosed implementations and detailed descriptions of what is well known in the art or redundant descriptions on substantially the same configurations have been omitted.

Hereinafter, implementations of the disclosure will be described in detail with reference to the accompanying drawings.

FIG. 1 is a control block diagram illustrating according to an exemplary implementation of the present disclosure.

Referring to FIG. 1, a vehicle 10 according to an exemplary implementation of the present disclosure may include an ignition relay 110, a seat sensor 120, a seat belt sensor 130, an occupant sensor 140, a door sensor 150, a door locking device 160, a communicator 170, an acoustic device 180, a user interface 200, an authentication key system 300, and a controller 400. The controller 400 may be electrically connected to various devices included in the vehicle 10 and control the various devices.

In some cases, the controller 400 may be implemented as a cloud server that provides one or more clients with functions and data storage by computer systems distributed over multiple locations.

The ignition relay 110 serves as an ignition switch to turn on and off the vehicle 10. When the ignition relay 110 is turned on, the vehicle 10 is turned on, and when the ignition relay 110 is turned off, the vehicle 10 is turned off. The controller 400 may control the ignition relay 110 to turn on or off the vehicle 10. The ignition relay 110 can be referred as a start relay or start switch.

The seat sensor 120 may detect whether an occupant is seated, and the seat belt sensor 130 may detect whether a seat belt is worn. Whether an occupant is present in the vehicle 10 may be determined based on data obtained by the seat sensor 120 and the seat belt sensor 130.

The occupant sensor 140 may detect an occupant inside the vehicle and generate occupant information. The occupant sensor 140 may include at least one of an image sensor provided inside the vehicle 10, a radar sensor provided inside the vehicle 10, and a weight sensor provided on the seat. The weight sensor may be included in the seat sensor 120. The occupant information may include at least one of image data obtained by the image sensor, radar data obtained by the radar sensor, or weight data obtained by the weight sensor.

The controller 400 may identify an assistant driver present inside the vehicle based on at least one of the image data obtained by the image sensor, the radar data obtained by the radar sensor, or weight data obtained by the weight sensor. The controller 400 may identify a type of the occupant located inside the vehicle 10 based on at least one of the image data, the radar data, and the weight data. For example, the controller 400 may identify whether the occupant is an adult, a child, or a person who can control the vehicle. The assistant driver may refer to a person who can control the vehicle 10.

The door sensor 150 may detect opening/closing of doors of the vehicle. The door locking device 160 may lock or unlock the doors of the vehicle 10. The door locking device 160 may be provided inside the door.

The communicator 170 may communicate with an external device located outside the vehicle 10. For example, the external device may be a mobile device carried by a driver. The communicator 170 may be controlled to transmit a notification that the starting authentication key has been removed from the vehicle, a vehicle theft caution notification, and/or door lock information to the mobile device.

At least one acoustic device 180 may be provided, and may be installed inside a dashboard and/or the doors. A sound (e.g., a voice, a warning sound) related to a function, state, and/or operation of the vehicle 10 may be output through the acoustic device 1180. The acoustic device 180 may include at least one speaker.

The user interface 200 may include an inputter 210 and a display 220. The inputter 210 and the display 220 may be provided at various positions inside the vehicle 10. For example, the user interface 200 may be provided in a cluster and/or a center fascia.

The inputter 210 may be provided on the center fascia, a head unit, and/or a steering wheel. The inputter 210 may include a button, a dial, and/or a touchpad related to various functions of the vehicle 1. For example, the inputter 210 may include a push button, a touch button, a touch pad, a touch screen, a dial, a stick-type operation device, and/or a track ball. The inputter 210 may be provided integrally with the display 220.

The display 220 may output various information related to a function, state, and/or operation of the vehicle 1. The display 220 may output a graphic user interface (GUI) including an object (e.g., an icon, a text, and an image) for executing or setting various functions of the vehicle 1. The GUI may interact with a user input. The display 220 may output a screen corresponding to an input for an object.

The display 220 may be a light emitting diode (LED) panel, an organic light emitting diode (OLED) panel, or a liquid crystal display (LCD) panel. Additionally, the display 220 may include a touch screen.

The authentication key system 300 may communicate with an authentication key located inside or outside the vehicle 10. The authentication key system 300 may search for and identify the authentication key for use of the vehicle 10. For example, the authentication key may include a smart key, a digital key, and/or biometric information. To identify such an authentication key, the authentication key system 300 may include a smart key identifier 310, a digital key identifier 320, and a biometric information sensor 330.

The smart key is a device such as a remote control configured for executing various functions of the vehicle 10, and may be referred to as a key fob or fob. The smart key identifier 310 may identify a smart key located outside or inside the vehicle 10. The digital key may be provided from an application installed on the driver's mobile device. The digital key identifier 320 may identify a digital key located outside or inside. The biometric information may include a fingerprint, face and/or iris. The biometric information sensor 330 may identify the biometric information.

The authentication key system 300 may perform a locking and/or unlocking of the vehicle 10 by identifying the authentication key. The authentication key system 300 may turn on or off the vehicle 10. In addition, the authentication key system 300 may control opening or closing of a trunk of the vehicle. The authentication key system 300 may generate a warning sound according to a location of the authentication key.

Electronic components provided in the vehicle 10 may communicate with each other via a communication network for vehicle (NT). For example, the electronic components may exchange data through networks such as Ethernet, media oriented systems transport (MOST), Flexray, controller area network (CAN), and local interconnect network (LIN).

The controller 400 may include a memory 420 that memorizes/stores programs, instructions, and data for controlling operations of the vehicle 10, and a processor 410 that generates a control signal for controlling the operations of the vehicle 10 based on the programs, instructions, and data memorized/stored in the memory 420. The processor 410 may include a digital processor for processing data of various sensors and a micro control unit (MCU) for generating a control signal. The processor 410 and the memory 420 may be implemented as separate chips or as a single chip. Additionally, the controller 400 may include a plurality of processors 410 and a plurality of memories 420.

The processor 410 may include a logic circuit and an arithmetic circuit, process data according to programs and/or instructions provided from the memory 420, and generate a control signal according to a processing result. The processor 410 may be electrically connected to various devices included in the vehicle 10.

The memory 420 may include not only volatile memories such as a static random access memory (S-RAM) and a dynamic random-access memory (D-RAM), but also nonvolatile memory such as a flash memory, a read-only memory (ROM), an erasable programmable read only memory (EPROM).

The controller 400 may obtain information regarding the authentication key identified by the authentication key system 300. The controller 400 may identify the starting authentication key used to turn on the vehicle 10 based on information provided from the authentication key system 300. The starting authentication key refers to an authentication key used as a means for turning on the ignition of the vehicle 10. When a plurality of authentication keys are identified outside or inside the vehicle 10, the controller 400 may distinguish the starting authentication key from any other authentication key among the plurality of authentication keys. For example, the starting authentication key may be a smart key, and another authentication key may be a digital key or biometric information.

The controller 400 may identify whether a driver gets off (i.e., exits) while the vehicle 10 is started. For example, when the seat belt is unlocked and the door is opened, it may be determined that the driver has gotten off. The controller 400 may identify whether the driver has gotten off based on unlocking of the seat belt detected by the seat belt sensor 130 and opening of the door detected by the door sensor 150.

The controller 400 may identify whether an assistant driver exists in the vehicle based on the occupant information provided from the occupant sensor 140. For example, the controller 400 may identify the assistant driver based on at least one of image data, radar data, and weight data provided from the occupant sensor 140. The controller 400 may identify the assistant driver by comparing the assistant driver information pre-stored in the memory 420 with the occupant information provided from the occupant sensor 140.

When a plurality of occupants exist in the vehicle 10, the controller 400 may identify whether each of the occupants corresponds to the assistant driver. The assistant driver may refer to a person different from the driver, and who has the authority to control the vehicle 10 or has obtained a driver license.

The controller 400 may control the display 220 to provide a notification that the starting authentication key has been removed from the vehicle or a notification of vehicle theft warning based on whether the starting authentication key or another authentication key exists and whether the assistant driver exists in the vehicle 10 after the driver gets off.

For example, after the driver gets off, the controller 400 may control the display 220 to provide starting authentication key information and the notification that the starting authentication key has been removed from the vehicle based on an absence of all of the assistant driver, the starting authentication key, and another authentication key, in the vehicle 10. The mobile device of a driver may also provide the starting authentication key information and the notification that the starting authentication key has been removed from the vehicle. The starting authentication key information may include information regarding an authentication key used to turn on the vehicle 10. When the vehicle 10 is turned on with the smart key, the display 220 may display the starting authentication key information to guide that the vehicle is turned on with the smart key.

When a warning is provided depending only on the departure of the starting authentication key from the vehicle, drivers may feel uncomfortable due to a warning provided even in a situation in which security of the vehicle 10 is not in danger. By providing the notification that the starting authentication key has been removed from the vehicle when all of the assistant driver, the starting authentication key, and another authentication key are not detected inside the vehicle 10, unnecessary warnings may be reduced.

Furthermore, after the driver gets off the vehicle, the controller 400 may control the display 220 to provide the starting authentication key information and the notification of the vehicle theft warning based on the absence of the assistant driver and a presence of the starting authentication key and another authentication key, in the vehicle 10. In other words, the controller 400 may control the display 220 to provide the starting authentication key information and the notification of the vehicle theft warning based on the fact that the assistant driver does not exist in the vehicle but the starting authentication key and another authentication key exist in the vehicle 10. The mobile device of the driver may also provide the starting authentication key information and the notification of vehicle theft warning.

Even though the driver leaves the vehicle 10 with the starting authentication key or another authentication key leaving inside the vehicle 10, the safety of the vehicle may be secured if there is the assistant driver inside the vehicle 10. However, when no other person, except for the driver, who can control the vehicle 10 exists inside the vehicle 10, an outsider may obtain the starting authentication key or another authentication key, leading to stealing the vehicle 10. In this case, vehicle theft may be prevented by providing the vehicle theft warning.

After providing the notification that the starting authentication key has been removed from the vehicle or the notification of vehicle theft warning through the display 220 and/or the mobile device, the controller 400 may lock the doors, based on the starting authentication key and another authentication key being not detected within a predetermined range around the vehicle. In response to the starting authentication key and another authentication key being not detected within the predetermined range around the vehicle, the controller may determine that the driver has moved away with all the authentication keys. In this case, because the risk of vehicle theft is high, vehicle security may be secured by locking the doors.

The controller 400 may unlock the doors based on the starting authentication key or another authentication key being detected again within the predetermined range around the vehicle, after locking the doors.

Figure 2:
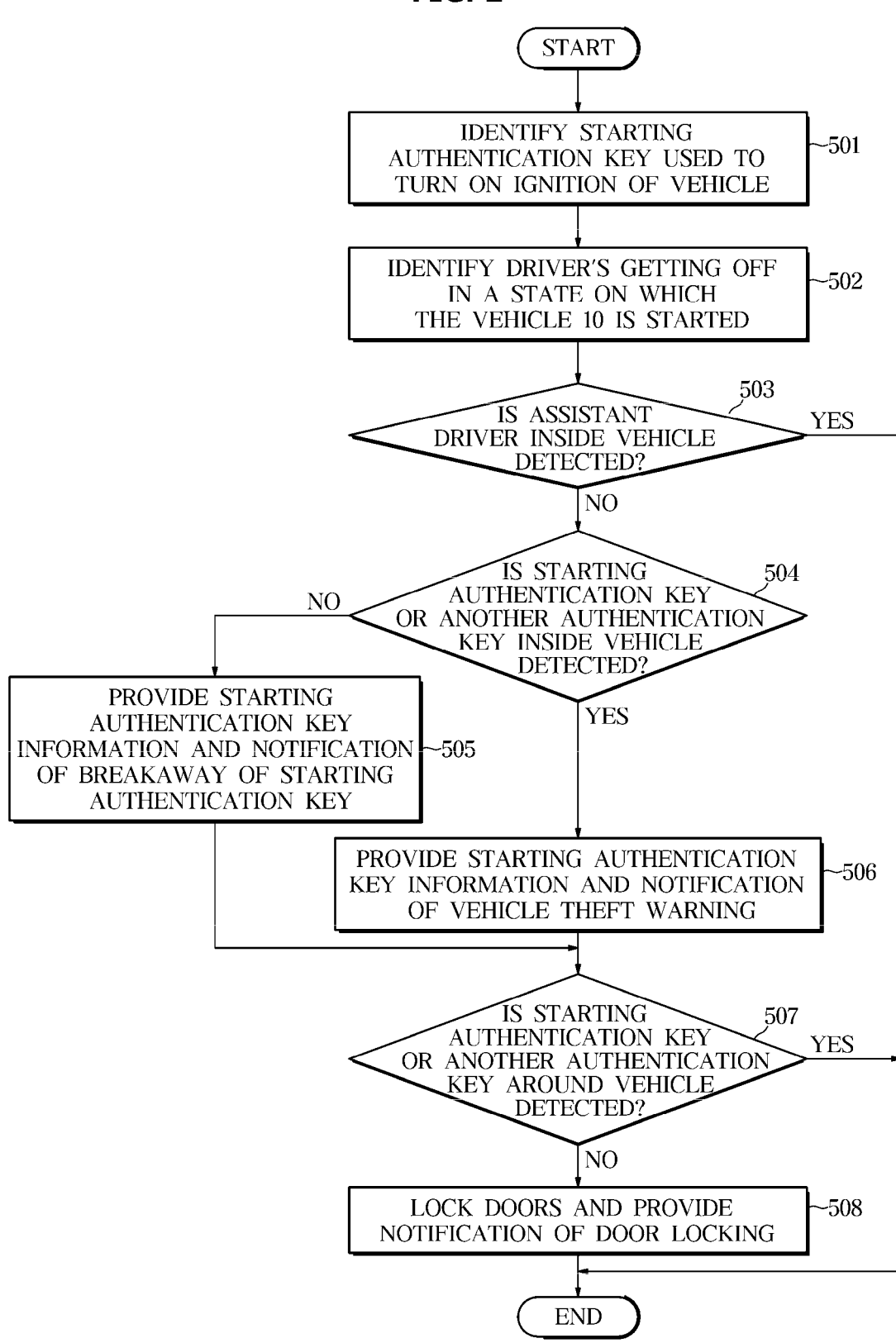
FIG. 2 is flowchart illustrating a method of controlling a vehicle according to an exemplary implementation of the present disclosure.
Figure 3:
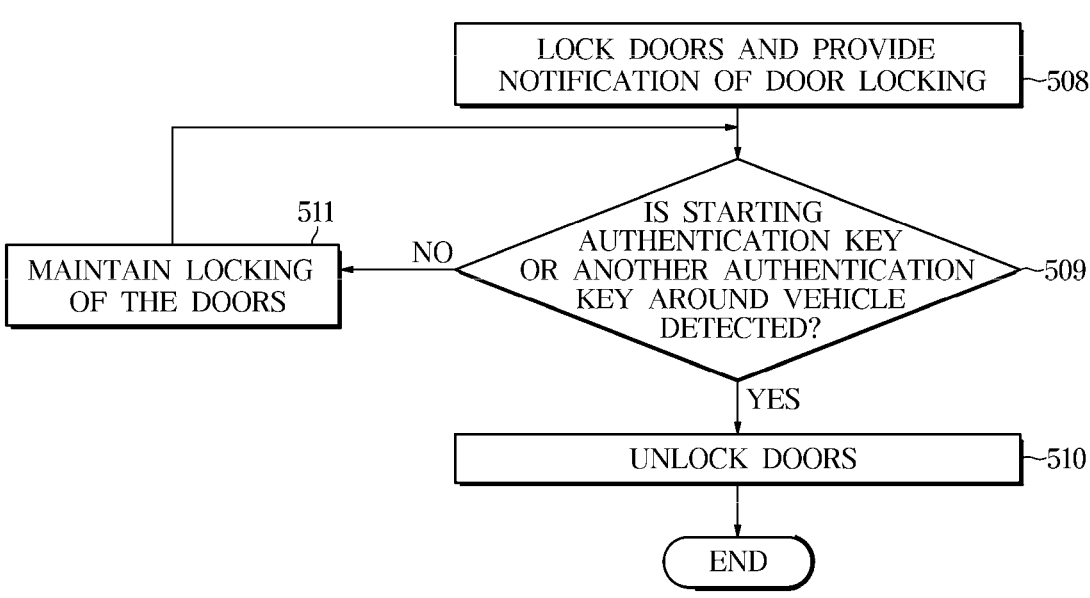
FIG. 3 is flowchart illustrating a method of controlling a vehicle according to an exemplary implementation of the present disclosure.
Figure 4:
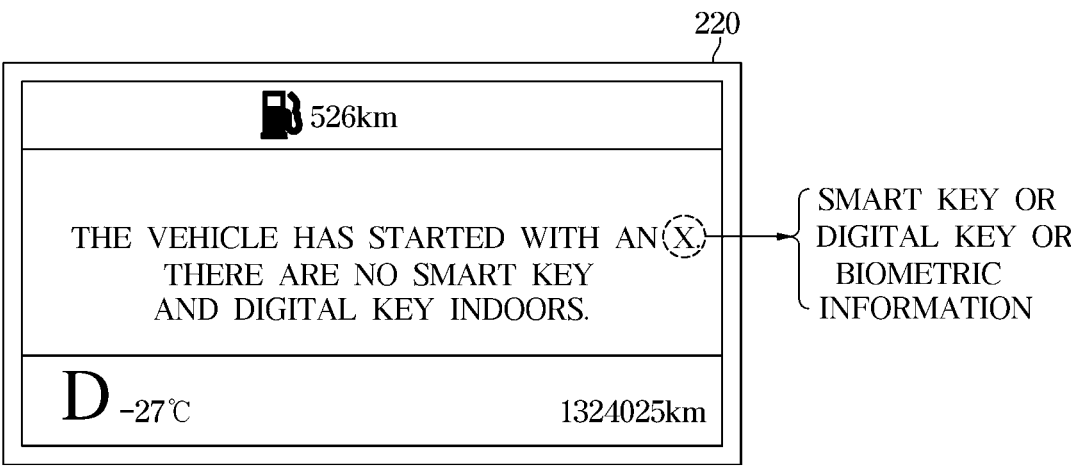
FIG. 4 is an example view illustrating a notification that the starting authentication key has been removed from the vehicle provided through a display.
Figure 5:
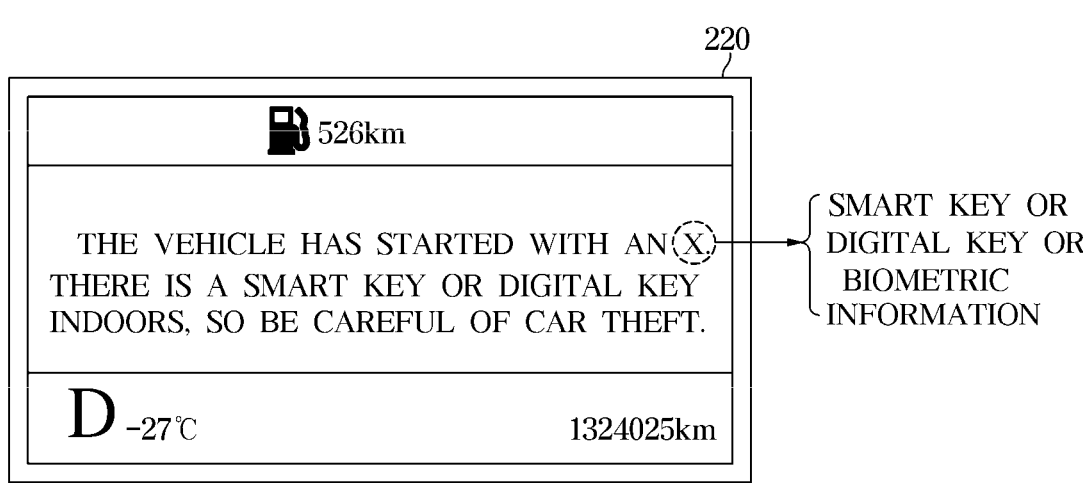
FIG. 5 is an example view illustrating a notification of vehicle theft warning provided through the display.
Figure 6:
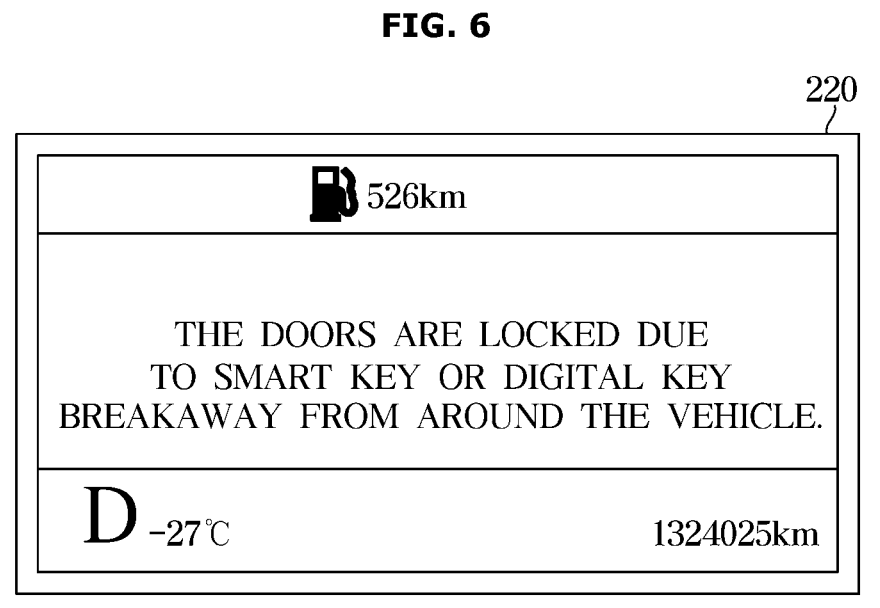

FIGS. 2 and 3 are flowcharts illustrating a method of controlling a vehicle according to an exemplary implementation of the present disclosure. FIG. 4 is a view illustrating the notification that the starting authentication key has been removed from the vehicle provided through the display. FIG. 5 is a view illustrating the notification of the vehicle theft warning provided through the display. FIG. 6 is a view illustrating the door lock notification provided through the display.

Referring to FIG. 2, the controller 400 of the vehicle 10 may identify the starting authentication key used to turn on the vehicle 10 (501). The controller 400 may identify the driver's getting off in a state on which the vehicle 10 is started (502). Furthermore, the controller 400 may identify whether the assistant driver presents inside the vehicle 10 (503).

The controller 400 may control the authentication key system 300 to search for the starting authentication key or another authentication key inside the vehicle 10 based on the fact that the assistant driver is not detected inside the vehicle 10 (504).

The controller 400 may control the display 220 to provide the starting authentication key information and the notification that the starting authentication key has been removed from the vehicle based on the absence of all of the assistant driver, the starting authentication key, and another authentication key in the vehicle 10 (505).

The controller 400 may control the display 220 to provide the starting authentication key information and the notification of vehicle theft warning, based on the absence of the assistant driver and the presence of the starting authentication key or another authentication key in the vehicle 10, after the driver gets off (506). When any other person except for the driver who may control the vehicle 10 does not exist inside the vehicle 10, an outsider may obtain the starting authentication key or another authentication key, leading to stealing the vehicle 10. In this case, vehicle theft may be prevented by providing the vehicle theft warning.

As shown in FIG. 4, the display 220 provided inside the vehicle 10 may output the starting authentication key information and the notification that the starting authentication key has been removed from the vehicle as text. For example, the display 220 may output text, for example, "the vehicle has started with an X. There are no a smart key and digital key indoors." X may be displayed as a smart key, a digital key, or biometric information.

As shown in FIG. 5, the display 220 provided inside the vehicle 10 may output the starting authentication key information and the notification of vehicle theft warning as text. For example, the display 220 may output text, for example, "the vehicle has started with an X. There is a smart key or digital key indoors, so be careful of car theft." X may be displayed as a smart key, a digital key, or biometric information.

In FIGS. 4 and 5, X, which is the starting authentication key, may be a smart key, a digital key, or biometric information. Because the biometric information belongs to the driver, when the driver gets off, the biometric information is deviated from the vehicle 10 along with the driver. Accordingly, after the driver gets off, the controller can just search for the presence of the smart key or digital key inside the vehicle 10.

The controller 400 may control the authentication key system 300 to search for an authentication key different from the starting authentication key within the predetermined range around the vehicle (507). The controller 400 may lock the doors based on the fact that the starting authentication key and another authentication key are not detected within the predetermined range around the vehicle. In addition, the controller 400 may provide the notification of door locking through the display 220 or the mobile device (508).

As shown in FIG. 6, the display 220 may output the door lock notification as text. For example, the display 220 may output text such as "the doors are locked due to the smart key or digital key deviating from around the vehicle."

Referring to FIG. 3, the controller 400 may control the authentication key system 300 to search for an authentication key different from the starting authentication key within the predetermined range around the vehicle after locking the doors (509). The controller 400 may unlock the doors based on the fact that the starting authentication key or other authentication key is detected again within the predetermined range around the vehicle (510). In response to the authentication key different from the starting authentication key being not detected within the predetermined range around the vehicle, the controller 400 may maintain locking of the doors (511).

As is apparent from the above, the vehicle and the method of controlling the same according to various implementations of the present disclosure may identify various authentication keys for use of the vehicle, and when a driver leaves the vehicle while the vehicle is started on, provide an appropriate notifications regarding vehicle security based on the locations of the authentication keys.

Further, the vehicle and the method of controlling the same according to various implementations of the present disclosure may provide an appropriate notifications regarding vehicle security by considering not only the locations of the authentication keys but also the presence or absence of the assistant driver.

On the other hand, the above-described implementations may be implemented in the form of a recording medium storing instructions executable by a computer. The instructions may be stored in the form of program code. When the instructions are executed by a processor, a program module is generated by the instructions so that the operations of the disclosed implementations may be carried out. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although implementations of the disclosure have been shown and described, it would be appreciated by those having ordinary skill in the art that changes may be made in these implementations without departing from the principles and spirit of the disclosure, the scope of which is defined in the claims and their equivalents.

What is claimed is:

1. A vehicle, comprising:
    an authentication key system configured to identify one or more authentication keys for use of the vehicle;
    an occupant sensor configured to detect an occupant inside the vehicle and generate occupant information;
    a display configured to display information regarding an operation of the vehicle; and
    a controller electrically connected the authentication key system, the occupant sensor, and the display,
    wherein the controller is configured to:
        identify a starting authentication key used to turn on the vehicle and one or more other authentication keys,
        identify a driver's getting off in a state in which the vehicle is turned on, identify whether an assistant driver is present inside the vehicle based on the occupant information,
        control the display to provide starting authentication key information and a notification of vehicle theft warning based on a presence of the one or more other authentication keys in the vehicle and an absence of both the driver and the assistant driver, and
        lock one or more doors of the vehicle based on the starting authentication key and one or more other authentication keys being not detected within a predetermined range around the vehicle, after the notification of vehicle theft warning is provided through the display.

2. The vehicle of claim 1, wherein the controller is further configured to:
    based on the driver getting off the vehicle, control the display to provide the starting authentication key information and a notification that the starting authentication key has been removed from the vehicle based on an absence of all of the assistant driver, the starting authentication key, and the one or more other authentication keys in the vehicle.

3. The vehicle of claim 1, wherein the occupant sensor includes at least one of an image sensor provided inside the vehicle, a radar sensor provided inside the vehicle, or a weight sensor provided on a seat of the vehicle, and
    wherein the occupant information includes at least one of image data obtained by the image sensor, radar data obtained by the radar sensor, or weight data obtained by the weight sensor.

4. The vehicle of claim 1, further including a communicator configured to communicate with a mobile device carried by the driver,
    wherein the controller is further configured to control the communicator to transmit a notification that the starting authentication key has been removed from the vehicle or the notification of a vehicle theft warning to the mobile device.

5. The vehicle of claim 1, wherein the controller is further configured to:
    unlock the one or more doors based on the starting authentication key or the one or more other authentication keys being detected within the predetermined range around the vehicle.

6. The vehicle of claim 1, further including a communicator configured to communicate with a mobile device carried by the driver,
    wherein the controller is further configured to control the communicator to transmit door lock information to the mobile device.

7. The vehicle of claim 1, wherein the starting authentication key and the one or more other authentication keys are one of a smart key, a digital key, or biometric information of the driver.

8. The vehicle of claim 1, further including a seat belt sensor configured to detect a locking state of a seat belt and a door sensor configured to detect opening and closing of a door of the vehicle,
    wherein the controller is further configured to identify the driver's getting off based on unlocking of the seat belt and opening of the door.

9. A method of controlling a vehicle, the method comprising:
    identifying, by a controller, a starting authentication key used to turn on the vehicle and one or more other authentication keys;

identifying, by the controller, a driver's getting off in a state on which the vehicle is turned on;

identifying, by the controller, whether an assistant driver is present inside the vehicle;

controlling, by the controller, a display to provide starting authentication key information and a notification of vehicle theft warning, based on a presence of the one or more other authentication keys in the vehicle and an absence of both the driver and the assistant driver; and locking, by the controller, one or more doors of the vehicle based on the starting authentication key and the one or more other authentication keys being not detected within a predetermined range around the vehicle, after the notification of vehicle theft warning is provided through the display.

10. The method of claim 9, wherein the controlling of the display further including:

providing, by the controller, starting authentication key information and a notification that the starting authentication key has been removed from the vehicle, based on an absence of all of the assistant driver, the starting authentication key, and the one or more other authentication keys in the vehicle, after the driver getting off the vehicle.

11. The method of claim 9, wherein the identifying of the presence of the assistant driver is based on at least one of image data obtained by an image sensor provided inside the vehicle, radar data obtained by a radar sensor provided inside the vehicle, or weight data obtained by a weight sensor provided in a seat of the vehicle.

12. The method of claim 9, further including:

transmitting, by the controller, a notification that the starting authentication key has been removed from the vehicle or the notification of vehicle theft warning to a mobile device carried by the driver.

13. The method of claim 9, further including:

unlocking, by the controller, the one or more doors based on the starting authentication key or the one or more other authentication keys being detected within the predetermined range around the vehicle.

14. The method of claim 9, further including:

transmitting, by the controller, door lock information to a mobile device carried by the driver.

15. The method of claim 9, wherein the starting authentication key and the one or more other authentication keys are one of a smart key, a digital key, or biometric information of the driver.

16. The method of claim 9, wherein the identifying the driver's getting off is based on unlocking a seat belt and opening a door of the vehicle.

\* \* \* \* \*